B. F. MULLANEY.
STORAGE BUILDING.
APPLICATION FILED JAN. 12, 1921.

1,390,635.

Patented Sept. 13, 1921.
3 SHEETS—SHEET 1.

Inventor,
Benjamin F. Mullaney,
by Roberts Roberts Cushman
his Attys.

B. F. MULLANEY.
STORAGE BUILDING.
APPLICATION FILED JAN. 12, 1921.
1,390,635.
Patented Sept. 13, 1921.
3 SHEETS—SHEET 2.
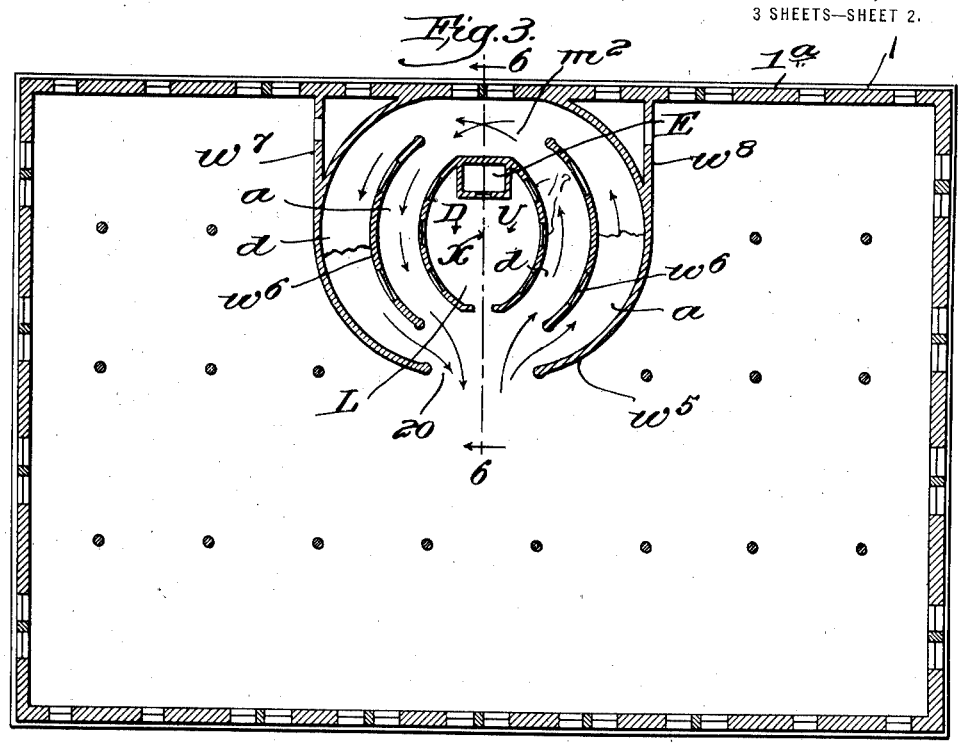
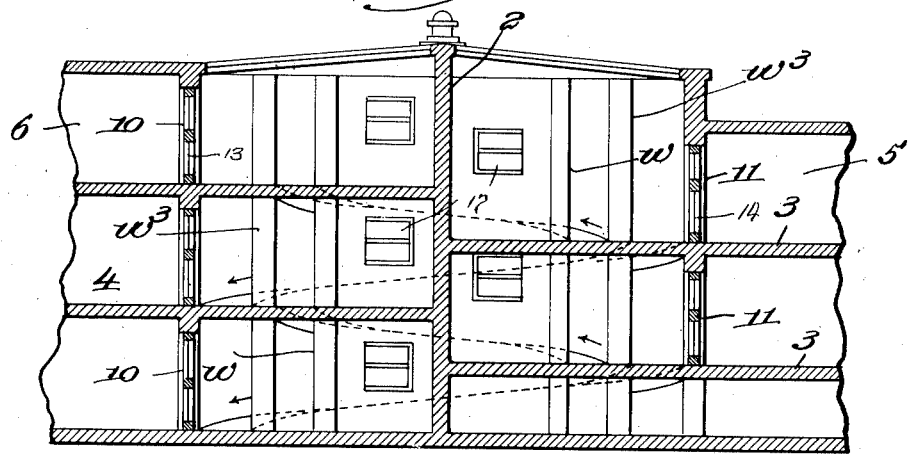

UNITED STATES PATENT OFFICE.

BENJAMIN F. MULLANEY, OF BOSTON, MASSACHUSETTS, ASSIGNOR TO JAMES PURDON, TRUSTEE, OF BOSTON, MASSACHUSETTS.

STORAGE-BUILDING.

1,390,635.  Specification of Letters Patent.  Patented Sept. 13, 1921.

Application filed January 12, 1921. Serial No. 436,653.

*To all whom it may concern:*

Be it known that I, BENJAMIN F. MULLANEY, a citizen of the United States, and resident of Boston, (Allston,) in the county of Suffolk and State of Massachusetts, have invented new and useful Improvements in Storage-Buildings, of which the following is a specification.

This invention relates to the construction of storage buildings particularly adapted for motor-carried loads, or for the storage of motor vehicles themselves.

Neither the construction nor the operative effect of buildings adapted to the housing of motor carried goods or motor vehicles (and especially of garages for the so-called "live storage" of motor vehicles, in which the arrival or departure of vehicles occurs often and irregularly) according to the practice heretofore achieved, is wholly satisfactory. This is particularly true where it is attempted, as in congested city districts, to provide for the free movement of vehicles into and out of the respective floors of a multiple-floor building, and where it is also essential to minimize in every way the large fire risk attendant upon the class of building and the nature of its use, and at the same time to provide for a high degree of structural stability within reasonable costs of erection.

The conditions in single-floor garages are comparatively simple and involve little difficulty. Where, as in congested city districts it is necessary to use several floors of a building for live storage of motor vehicles, elevators have usually been resorted to, and turn tables for the better direction of vehicles to their respective stalls. As the vehicles which have the largest turning radius can turn inside a circle about sixty feet in diameter, but no less, much time is consumed in getting the vehicles into or out of their stalls, and a serious amount of abrasion and damage to the vehicles results from the generally prevailing conditions.

Inclined ways, adapted to the passage of motor vehicles from floor to floor have been used instead of elevators, and it has been proposed to employ two spiral ways, one inside the other, for this purpose, so that motor vehicles in transit either up or down may proceed without having to pass each other; but this, and indeed any arrangement of inclined ways, heretofore contrived, involves the occupation of a large amount of space, which, in the localities where many storied garages have to be used, is very costly.

The main object of my invention is to arrange spiral ways for motor vehicles from floor to floor of a garage in such a manner that space shall be economized, and so that the vehicles shall all move in the same direction, whether going up or down. Other objects of my invention will appear from the description which follows.

The fundamental structural principles, exemplied (in one form) by the arrangements shown in the drawings, will be understood, and their application to specific variants of construction made manifest, by the following analysis of the geometrical relationship of the two intersecting spiral ways. As the locus of a linear spiral is a cylindrically developed surface (best exemplified by a cylinder or cylindroid) so the locus of a spiral which, like each of the spiral ways herein described has a horizontal radial dimension, is an annular space bounded by an inner and an outer cylindrical or cylindroidal surface. The two such annular spaces, which are the loci of the intersecting spiral ways, intersect each other at diametrically opposite points, or rather, regions, so that the outer cylindrical boundary surface of each lies close to the inner cylindrical boundary surface of the other in a segment between the two opposite regions where the annular locus-spaces intersect. Such intersecting, annular, cylindrical or cylindroidal geometric volumes may be represented by taking two similar flat rings, each like a letter O, and laying one on the other, with their centers laterally displaced such a distance that the outer edge of one ring lies close to the inner edge of the other in the segment between the diametrically opposite regions where the two rings cross each other.

Then, if a right handed spiral path or way be developed in one such annular volume, and a similar left handed spiral way be developed in the other, the fundamental principle of construction which embodies this invention will be expressed, provided the planes which represent the successive floors are arranged so that each floor has access to both spiral ways.

By observing and adhering to this structural principle, ways for up and down travel of vehicles from floor to floor, on which vehicles whether going up or down, travel in the same rotary direction can be provided with the least possible sacrifice of space in the building.

One object of my present invention is to provide new constructions permitting the application of the principle of interconnected and intersecting right-hand and left-hand spiral ways, to the great increase of the structural strength of the building, and to situations in which the storage spaces to be served may be those of any type of building whether rectangular or of other form, in which the floors may or may not be horizontally discontinuous or vertically staggered, from one part of the building in relation to those in another part of the building; and in which provision is made for dividing parts of the storage spaces from other parts, and for inclosing the passageways from floor to floor against communication from floor to floor, or from the passageways to the floor spaces. A particular object of the present invention is therefore to provide a storage building for the general purpose with ingress and egress spiral ways capable of caring for incoming and outgoing traffic without confusion, and which also shall have adequate provision for closing off the passageways from the remainder of the building as a protection against the communication of fire from one floor to another floor or from one part of a floor to another part of the same floor.

I make use of the principle of spiral ways contained in intersecting annular, cylindrical or cylindroidal geometrical volumes, of which a section in plan may be represented by two inter-locking flat annular spaces having their centers displaced from each other by at least the width of the respective annuli in a radial direction common to each. The vertical spaces above the space in plan occupied by such a pair of annuli is in the new construction occupied by a spiral way ascending from floor to floor above one annulus in an upward direction to the right and above the other annulus in a downward direction to the right. The spaces represented by the intersection in plan of the cylindrical or cylindroidal spaces represented by these annuli are utilized, as the location of a flat space, for intersecting lines of traffic, one side of which may communicate with the adjacent storage space between floors. This flat space may be and preferably is level with the floor of the space which it serves.

I shall now describe the invention in connection with particular species only illustrated in the accompanying drawings in which,—

Fig. 3 is a plan of a building also of generally rectangular form having undivided floor spaces and containing a construction corresponding to the invention;

Fig. 4 is a section on line 4—4 of Fig. 2;

Figure 2:
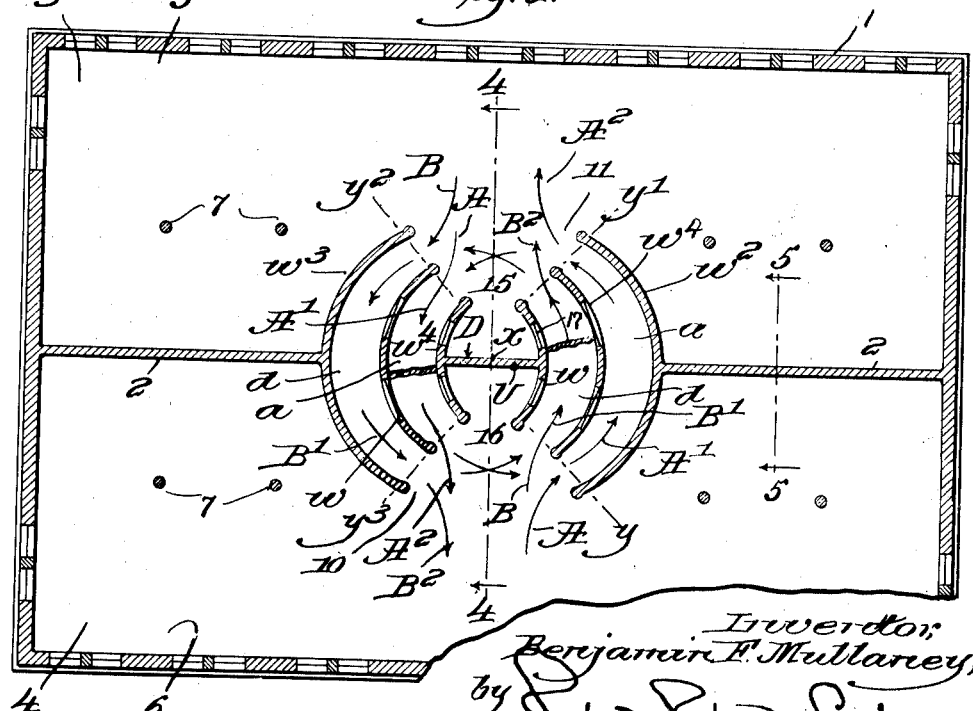
Fig. 2 is a plan, above the ground floor of a typical rectangular building vertically divided by an internal fire wall and having therein a construction corresponding to the present invention.

Referring to Fig. 2 the new devices may be placed in a building having exterior or curtain walls 1, of any desired construction providing sufficient piers for the vertical compression strains and having window and door openings conformable to the purpose for which the building is to be used and to esthetic appearance, and having a preferably fireproof arrangement of floors and roof. As shown, the rectangular building in the usual construction is divided on its longer axis by the internal fire wall 2, and is provided with floors 3, 4, (of concrete or beam and cambered arch, or any other masonry or steel-frame construction) forming on each floor the large storage spaces 5 and 6, intermediate support of the floors being provided by any usual expedient such as the columns 7.

Figure 5:
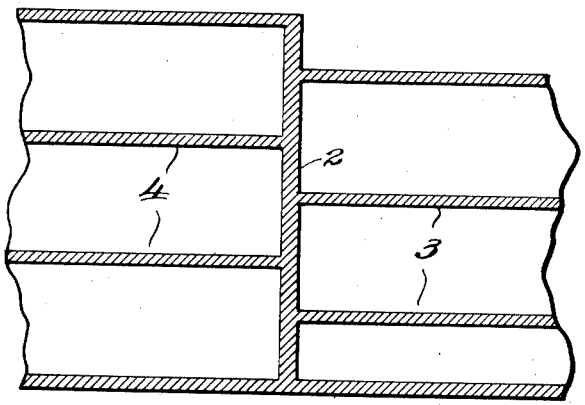
Fig. 5 is a section on the line 5—5 of Fig. 2.

When there is a division of the main space within the curtain wall 1, by a main partition or fire wall 2, I prefer to arrange the floors 3 at respectively different levels from the floors 4, so that the juncture of one series of these floors, see Fig. 5, with the fire wall 2 occurs at places not coincident with the juncture therewith of the remaining floors of the other portion of the building. Preferably this staggering or spacing of one set of floors in respect to the other set of floors is not an even division. The floors 3, for instance, reach the wall 2 at a point nearer one floor 4 than the next floor 4 above it.

Let it be assumed then that it will be desired to transport a load from one of the floors 4 up to one of the floors 3 and thence to the next floor 4. The distance through which a load must be lifted in passing from any floor 4 to the next floor 3 is less than the distance through which the load must be lifted in passing from any floor 3 to the next floor 4.

This staggered arrangement of floors is conformable to a preferred application of the intermeshing spiral ways above referred to.

Figure 1:
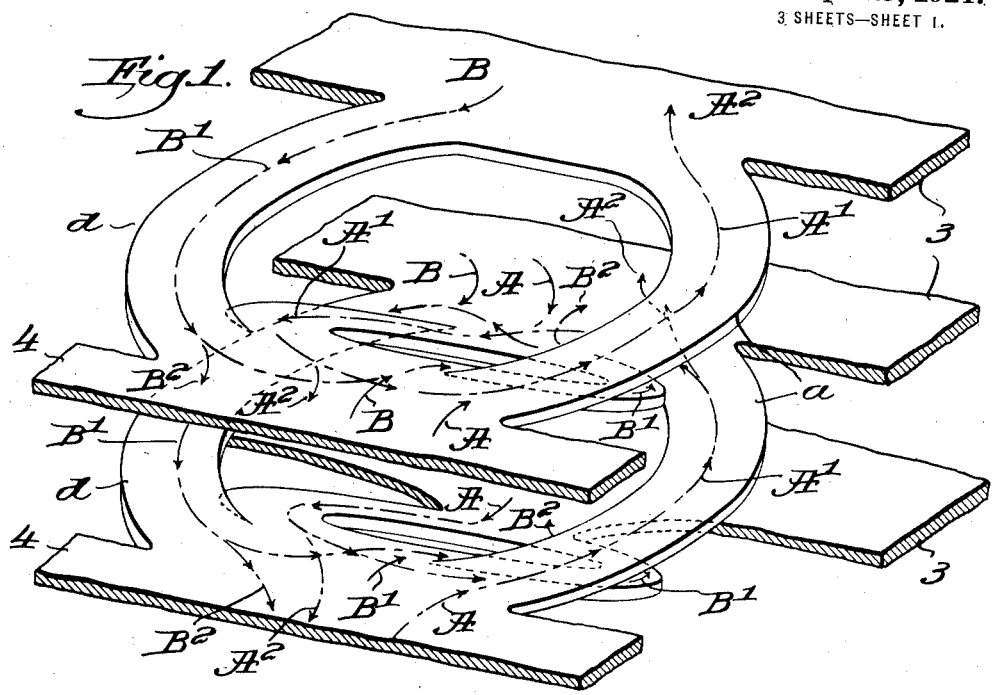
Figure 1 is a schematic perspective in the nature of a diagram illustrating the relationship of a specific form of ramp construction and the floors of the storage spaces served thereby.

Referring now to Figs. 1 and 2 the operation of the building is based upon the principle of establishing currents of motion of the vehicles or loads entering the building or the ways in direction A and passing from floor to floor upwardly in the rotative direction A' which is counterclockwise as shown, and leaving the ascending ways at any floor at A², vehicles or loads leaving the building or passing downwardly from floor to floor moving in the rotative direction B', also counter-clockwise as shown, leaving the ways or the building in directions B², and entering the down-going ways in directions B.

Referring to Fig. 2, the stream moving in the direction A' moves upwardly about the center U on the spiral-way $a$ central at U. This is a right-handed spiral. A load entering in any direction B on an intermediate floor may also pass upon a downgoing way $d$ central at D, which downgoing way is a left-handed spiral. Between floor-levels the ways $a$ and $d$ are positive inclines or ramps.

Each of the spirals $a$ and $d$ is contained in its own cylindriform solid respectively central about the center U and about the center D. These centers are displaced from each other by something more than the width of the respective ramps. When I say that the ramp $a$ is central about the center U, I am not to be understood as implying truly circular surfaces, since it is obvious that ellipsoidal or compound circular curves may be relied upon to define the inner and outer edges of the respective ways and the ramps forming a part of them.

The above relationship of the downgoing and upgoing passageways leads to certain marked advantages in the operation of the building in relation to the traffic into and out of the spaces therein, and also leads to a fundamental simplicity of construction relating to prescribed conditions of inclosure of the passageway spaces from floor to floor. Particularly the construction also lends itself to columnar rigidity against lateral stresses and vertical compression stresses. This advantage is so well marked as materially to aid in the reduction of the material and labor required in the erection of ascending and descending passageways according to my invention as compared with any other form of construction for ascent and descent of moving loads of which I am aware.

Recurring to Fig. 2, it will be observed that the spiral way $a$ comprises two segments of about 90° more or less which are respectively outside of and inside of the corresponding segments of the way $d$. At these segments the ways osculate with, are defined by, and may be integral with or be hung upon curved segmental walls $w$, $w$, which may be central upon the vertical axis $x$. The exterior or peripheral surfaces of the ascending way $a$ and the descending way $d$ for something more than 90° are coincident with, and may be made integral with the vertical segmental walls $w^2$ and $w^3$.

These may be cylindrical segments respectively central upon the axis U and the axis D. The segmental walls $w$, $w^4$, $w^2$, and $w^3$, may be unbroken from foundation to roof.

As shown in Fig. 2 the up and down passageways bounded by the walls $w^2$, $w^3$ are formed as an interruption of the fire wall partition 2, the whole structure being a great column adapted to support the entire building against lateral turning stresses. Constructions of the curtain and partition walls 1 and 2 which would otherwise be impracticable for lack of resistance to wind, earthquake and load-traffic stresses are rendered feasible by the presence in the building of the columnar inclosed-way construction within and including the inclosing walls $w$, $w^4$, $w^2$ $w^3$.

When I speak of spiral ways $a$ and $d$, it will of course be understood that I do not imply that the surfaces $a$ and the surfaces $d$ ascend or descend unbrokenly in screw-thread form. A great variation of arrangement is practicable, and it is sometimes desirable, as in the form shown for a building of the type illustrated in Fig. 2, that segments of the respective upgoing and downgoing spiral ways shall not be ramps—for instance, the parts not included between the inner segmental walls $w^4$ and the outer segmental walls $w^2$ $w^3$, respectively, may be levels constituting horizontal interruptions of or breaks in the upward progress of the general spiral understood by the term "spiral way."

These coincident levels of the two systems of ways are made to correspond with the respective floors 3 and 4. This will be more apparent from a diagram, Fig. 1, in which it will be observed that the floors 3 and 4 coincide with so much of the upgoing and downgoing way constructions as are in plan coincident with each other. The forward and rearward boundaries of these coincident spaces are represented by the front opening 10 and the rear opening 11 (see Fig. 2) between the respective segments $w^2$ and $w^3$ of the boundary wall of the way inclosure. These openings may or may not extend from floor to floor, see Fig. 4, and can be and preferably are closed by the fire doors, 13, 14.

The two intersecting cylinders represented by the ways leave a central space which may be utilized for any desired purposes. This space is defined by the inner walls $w^4$, $w^4$, and into this space door openings 15, 16 may enter at the levels of the floors 3 and 4, or either of them. The space may be provided with windows 17, and with floors at any desired level, for instance, the levels of the respective floors 3 and 4. A dividing partition on the line of the fire wall 2 may or may not be erected. In a garage these spaces are convenient locker, washer, or check rooms. The inner segments of the respective ramps $a$ and $d$ may be connected to and support, or be supported by, the respective walls $w^4$, $w^4$.

As best illustrated at Fig. 4 it will be noticed that the ascent of a vehicle moving from a floor 4 to the next higher floor 3 along the appropriate ramp segment of the way $a$ occurs in respect to the central axis $x$ during passage between the radial lines $y$ and $y'$, Fig. 2, and it will be noticed that the level floors merge into the ramp about at the lines $y$, $y'$. Similarly a descending vehicle passing from the floor 4 to the next lower floor 3 on the appropriate ramp segment of the way $d$ makes a descent from the line $y$ to the line $y'$. As a linear distance, the last-mentioned distance is less than the ascending distance, being a segment of substantially the same angle on a shorter radius. The same facts are true with regard to the descending and ascending segments at the left-hand of center $x$, these, as slopes, being defined between the radial lines $y^2$ and $y^3$. But the longer distance traveled in ascent from the floor 4 to the floor 3 than in ascent from the floor 3 to the floor 4 coupled with the obverse arrangement in respect to descents, enables these differences in length of travel from floor to floor to be utilized as illustrated in Fig. 5, by making the vertical distance from the floor 4 to a floor 3 less than the distance from a floor 3 to a floor 4. One consequence of this is to enable the respective ramp segments of the ways $a$ and $d$ to advance at the same angle or pitch. This angle or pitch may be chosen for the requirements of the particular type of motor vehicle intended to be stored.

As will be obvious, the ascent and descent of vehicles on the respective spirals $a$ and $d$ takes place in the same direction around the axis $x$, that is, counterclockwise as shown in Fig. 2. Ascending and descending vehicles are in possibility of contact with each other only at the region of the openings 10 and 11, and at these points they are passing in the same direction and on the level portions of the spiral paths coincident with the respective floors.

Any vehicle may be detached from the upgoing or the downgoing series to enter upon either of the floors upon turning to the right at the appropriate door 10 or 11. A vehicle may enter either the upgoing or the downgoing spirals from any floor upon passing into the appropriate door 10 or 11 and entering the ways $a$ or $d$ at will, dependent upon desire to ascend or descend.

The described arrangement may be adopted with all of the mentioned advantages in a building in which floors are one continuous level, for instance as is illustrated in Fig. 3. In this case the ascending way $a$ and the descending way $d$ may be related to each other exactly as above described, but the solid defined by the coalesced ways is inclosed as a whole in an oval fire wall $w^5$ which as before constitutes an integral column of the building. This column may be placed at any appropriate place in the building; as shown against the rear wall $1^a$, which may form a part of the inclosure.

Figure 6:
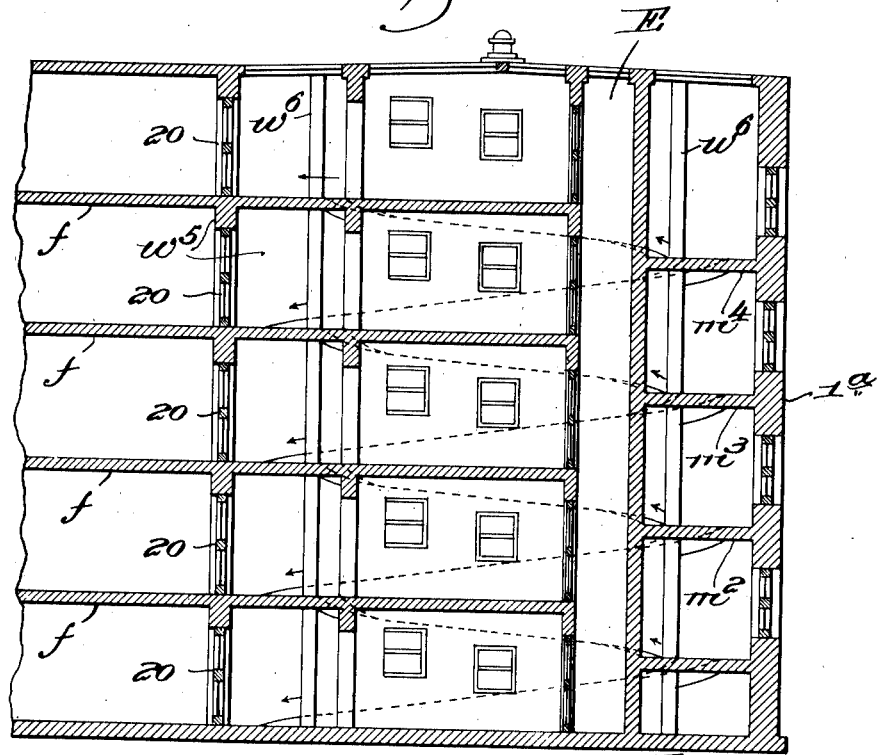
Fig. 6 is a section on the line 6—6 of Fig. 3; certain internal construction not being shown.

Referring now to Fig. 6, the slope of the ramps and hence the dimension of the inclosing wall $w^5$ is fixed by the maximum slope adapted to be used by the vehicles intended to be stored in connection with the distance to be traveled from floor to floor. I have found that the most economical arrangement of space follows when the vehicle can be permitted to make a complete or nearly complete turn about the spiral during the ascent from floor to floor. In order to provide this in a building in which the storage floors are of the same level, as in the instance under discussion, I may resort to the device of mezzanine floors $m'$, $m^2$, $m^3$, $m^4$, see Fig. 6, at the rear passing points for vehicles ascending and descending the spiral ways, and within the inclosure or column $w^5$.

In the construction shown in Figs. 3 and 6 ascent and descent to each storage floor $f$ is through a fire-door 20 in the front face of the wall $w^5$. The respective right and left-hand ramps of the spiral ways within the wall $w^5$ may if desired be separated by walls $w^6$ which may be circular segments central on the axis $x$. The space within the intersecting spirals may be utilized in any desired way, for instance for a locker room space L and an elevator well E.

When the great column represented by the wall $w^5$ is placed against or near one of the curtain walls $1^a$ of the building, this wall may be tied to the column by the tangential walls $w^7$ $w^8$, which divide off triangular spaces useful as shops, locker-rooms or offices.

The construction of the ramps may be any construction appropriate to the conditions of resistance to floor wear, and vibration, ease of construction and inexpensiveness of materials. Preferably each of the ways is built upon a series of radial girders bridging the space between the boundary walls at each side of the passageway constituting the ramp. These may be separate structures of iron or steel, may be poured concrete masses integral with the wall and with each other, or may be cambered arches of masonry finding their compression abutments in the respectively lateral boundary walls $w$, $w^2$, $w^3$, $w^4$, $w^5$, etc.

In any of the described constructions, occurrence of fire in any of the storage spaces will not prevent the safe passage from all of the spaces served by the ways of vehicles from every other space. Closure of the fire doors at 10, 11 or 20 for the storage space affected isolates the fire and protects the entrance and exit ways within their inclosure.

I claim:

1. Storage building construction, comprising a succession of floors, and two spiral ways adapted to vehicle travel from floor to floor, one way a right-handed, the other a left-handed, spiral, the geometrical locus of each spiral being an annular space bounded by cylindrically developed surfaces, the two said spaces intersecting each other at diametrically opposite regions, the outer boundary surface of each space lying close to the inner boundary surface of the other in the segment between regions of intersection, and each floor having access to both spiral ways.

2. Storage building construction, comprising a succession of floors, and two spiral ways adapted to vehicle travel from floor to floor, one way a right-handed, the other a left-handed, spiral, the geometrical locus of each spiral being an annular space bounded by cylindrically developed surfaces, the two said spaces intersecting each other at diametrically opposite regions, the outer boundary surface of each space lying close to the inner boundary surface of the other in the segment between regions of intersection, and each floor having access to both spiral ways at a point where the two ways intersect.

3. A multiple-story storage building having therein up-going and down-going intersecting spiral ways defining respectively a substantially continuous left handed and right handed spiral, whereby traffic revolves about the respective spiral axes in the same direction, the spiral ways having levels coincident with each other and the respective floors.

4. Storage building construction, comprising a series of floors, and two spiral ways adapted to travel of motor vehicles from floor to floor, one of said ways a right-handed spiral, the other left-handed, the two spirals intersecting at diametrically opposite points and coincident with floors at opposite sides, respectively.

5. Storage building construction, comprising a series of floors, and two substantially continuously defined spiral ways adapted to travel of motor vehicles from floor to floor, one of said ways a right-handed spiral, the other a left-handed spiral, the two spirals intersecting each other at intervals.

6. A storage building having therein a plurality of floors, a hollow columnar wall construction and intersecting right-hand and left-hand spiral ways, each substantially continuous, included in the space within said wall construction and tied thereto.

7. A storage building having therein a hollow columnar wall construction and intersecting right-hand and left-hand spiral ways comprising oppositely curved ramps included in the space within said wall construction and tied thereto.

8. A storage building having therein a hollow columnar wall construction and intersecting right-hand and left-hand spiral ways, each substantially continuous, included in the space within said wall construction, the said wall construction having one or more access openings adapted to be closed by fire-doors.

9. A storage building having therein a hollow columnar wall, intersecting right-hand and left-hand spiral ways inclosed in the space within said wall construction, said wall construction having one or more access openings adapted to be closed by fire doors, and opening upon coincident regions of the two spiral ways.

10. A multiple-story storage building having therein up-going and down-going spiral ways respectively in intersecting cylindriform spaces, and having a boundary wall comprising vertical segments each bounding peripheral portions of the said respective ways.

11. A multiple-story storage building having therein intersecting up-going and down-going spiral ways in intersecting cylindriform spaces, and a boundary wall comprising vertical segments each bounding peripheral portions of the said respective ways, intersecting the floors and conjoint with the floors and said ways respectively.

12. A multiple-story storage building having therein intersecting up-going and down-going spiral ways in intersecting cylindriform spaces, said ways having a boundary wall comprising vertical segments each bounding peripheral portions of the said respective ways and integral with the slopes or ramps of said ways and extending from floor to floor.

13. A multiple-story storage building having therein up-going and down-going spiral ways in intersecting cylindriform spaces, said ways having a boundary wall comprising vertical segments each bounding peripheral portions of the said respective ways, and internal segmental walls at the osculating segments of the respective cylindriform spaces.

14. A multiple-story storage building having therein up-going and down-going intersecting spiral ways defining a left-hand and a right-hand spiral respectively, whereby traffic revolves about the respective spiral axes in the same direction, the spiral ways having levels coincident with each other and the respective floors, in combination with a surrounding inclosure contacting with the peripheries of the respective spiral ways, and having ingress and egress openings to the said floors at the said levels.

15. A multiple-story storage building having therein up-going and down-going intersecting spiral ways each defining a left-hand and a right-hand spiral respectively, whereby traffic revolves about the respective spiral axes in the same direction, the spiral ways having levels coincident with each other and the respective floors, in combination with a surrounding inclosure contacting with the peripheries of the respective spiral ways, and having ingress and egress openings to the said floors at the said levels and means for closing said respective openings.

16. A storage building having therein storage spaces horizontally divided by floors and mezzanine floors and having a vertical columnar inclosure intersecting the floors, said inclosure having therein spiral ascending and descending ways intersecting at said floors, and also intersecting at mezzanine floors within said inclosure.

Signed by me at Boston, Massachusetts this fifth day of January, 1921.

BENJAMIN F. MULLANEY.